United States Patent [19]

Parker

[11] Patent Number: 4,672,860
[45] Date of Patent: Jun. 16, 1987

[54] PUSH ROD TO PEDAL ARM CONNECTION

[75] Inventor: Donald L. Parker, Middletown, Ohio

[73] Assignee: General Motors Corporation, Detroit, Mich.

[21] Appl. No.: 826,893

[22] Filed: Feb. 6, 1986

[51] Int. Cl.⁴ .............................................. G05G 1/14
[52] U.S. Cl. ....................................... 74/512; 74/560; 403/354
[58] Field of Search ................. 74/579 E, 579 R, 512, 74/560, 561, 105, 104, 47; 403/375, 354, 125, 161; 188/2 R

[56] References Cited

U.S. PATENT DOCUMENTS

| | | | |
|---|---|---|---|
| 2,222,219 | 11/1940 | Adams | 74/561 X |
| 2,964,303 | 12/1960 | Smith et al. | 74/579 X |
| 3,052,130 | 9/1962 | Kellogg et al. | 74/579 X |
| 3,698,260 | 10/1972 | Shellhause | 74/560 |
| 3,766,802 | 10/1973 | Shellhause | 74/512 |
| 3,869,279 | 3/1975 | Grimes et al. | 74/512 X |
| 3,885,449 | 5/1975 | Green | 74/560 X |
| 4,022,081 | 5/1977 | Dodd et al. | 74/560 X |
| 4,192,026 | 3/1980 | Williams | 403/354 X |
| 4,297,550 | 10/1981 | Leighton | 74/512 X |

Primary Examiner—Gary L. Smith
Assistant Examiner—Rodney M. Lindsey
Attorney, Agent, or Firm—D. D. McGraw

[57] ABSTRACT

A brake pedal arm has a push rod mounting bracket slotted to receive a reduced diameter portion of the push rod when the booster assembly of which the push rod is a part is installed from the forward side of a vehicle dash. The bracket has body sections formed at an angle to locate the push rod and keep it from becoming disengaged once the assembly connection has been completed. A bumper provided on the push rod eliminates click noises generated by engagement of the push rod and the pedal arm bracket during fast release of the pedal arm.

3 Claims, 3 Drawing Figures

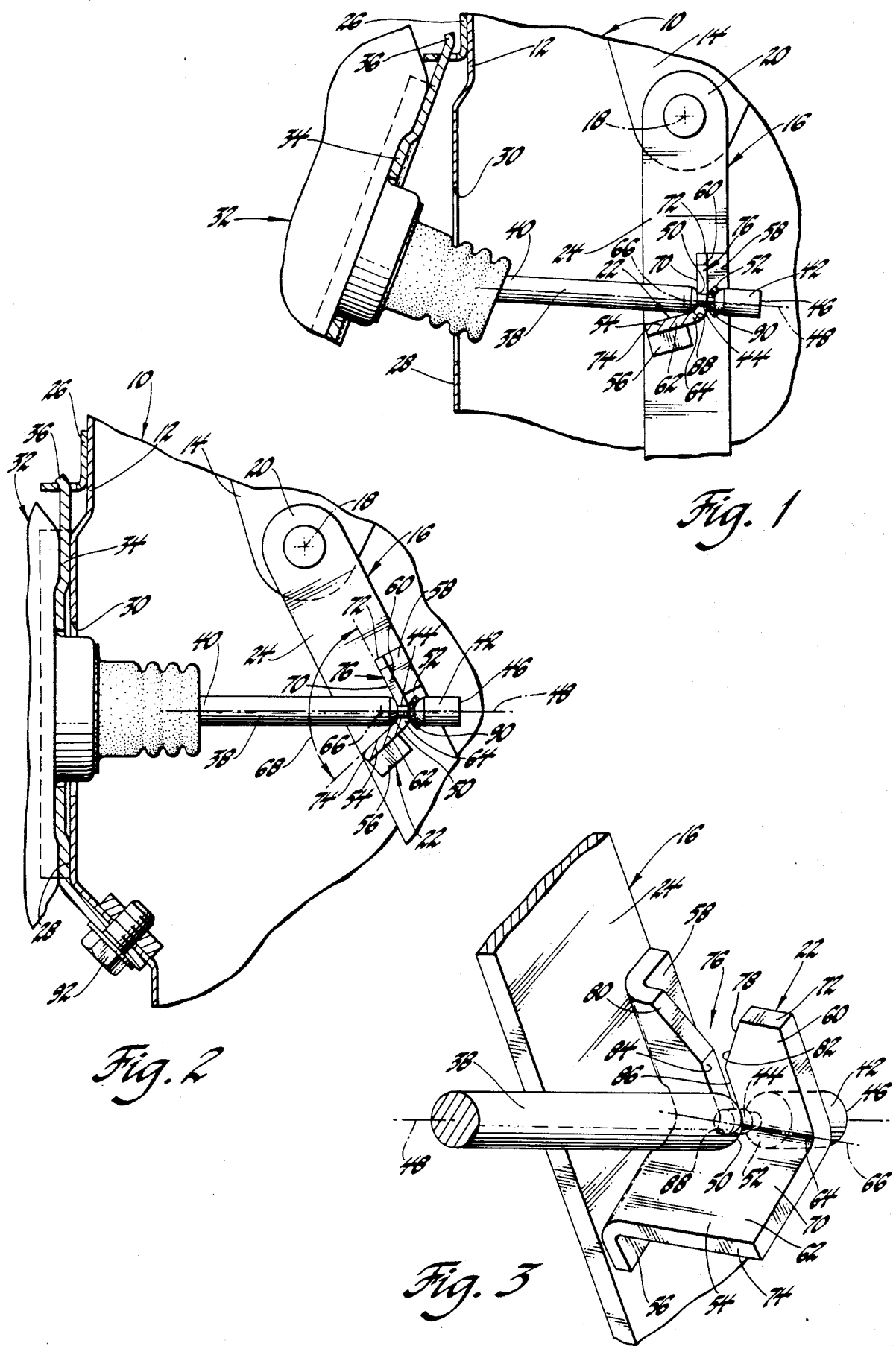

PUSH ROD TO PEDAL ARM CONNECTION

The invention relates to the connection of a push rod such as that used in actuating a brake booster mechanism to a pedal arm such as the brake pedal arm in a vehicle.

The conventional type of connection has used a pin extending through an opening in the pedal arm, the rear end of the push rod being provided with an eye through which the pin extends, a spring wave washer on the pin and a clip placed over the end of the pin to hold the entire assembly in place. This type of connection has required assembly from the passenger compartment side of the vehicle dash. Assembly is time-consuming in that the spring washer must be placed on the pin, the push rod eye then placed on the pin, and the retainer clip then be put in place by hand.

The connection embodying the invention enables the installation of the push rod from the forward compartment side of the vehicle dash. It does not require the time consuming operation of inserting a pin through an eye and a clip on the end of the pin. It is particularly adapted for use with a pivoting type of brake booster mounting arrangement such as that shown in concurrently filed U.S. application Ser. No. 826,887 entitled "Booster Mounting Arrangement" and assigned to the common assignee. In that arrangement, the booster has a mounting bracket secured thereto which has a suitable pivoting connection to the forward compartment side of the dash, with the booster input rod already attached to the booster and being inserted through an opening in the dash so that it is positioned near the pedal arm and in the bracket forming a portion of the invention claimed herein to provide the connection. The booster is then pivoted into place and fastened by suitable mounting bolts. By this arrangement the push rod is merely positioned so that it slides downwardly to its final assembly position and remains in that position without further attachment operations.

IN THE DRAWING

FIG. 1 is a fragmentary elevation view, with parts broken away and in section, illustrating the push rod connection immediately after it has been installed in connected relation and before the booster assembly has been pivoted and secured in its permanently mounted position.

FIG. 2 is similar to FIG. 1 but shows the booster assembly and its push rod in the permanently mounted position, the push rod and booster assembly having moved the brake pedal arm to the normal released position.

FIG. 3 is a fragmentary perspective view of the connection embodying the invention as illustrated in FIGS. 1 and 2.

The portion of the vehicle 10 illustrated in the drawings includes the dash 12 and a suitable vehicle body portion 14 which may be a bracket or panel positioned in a generally fore-and-aft plane which is parallel to the normal plane of movement of the brake pedal arm 16. Pedal arm 16 is illustrated somewhat schematically as having its upper end 20 pivotally attached to the vehicle body portion 14 so that it pivots about axis 18, that axis being substantially perpendicular to the plane of the movement of the pedal arm. The lower end of the pedal arm 16, not shown, is provided with the conventional pedal for foot actuation by the vehicle operator. A bracket 22 is secured to one side 24 of the pedal arm 16 in spaced relation from pivot axis 18 in a direction along the pedal arm toward the foot pedal.

The dash 12 is illustrated as having a booster mounting bracket 26 secured to its forward side 28. The dash also has an opening 30 extending therethrough. The booster assembly 32 is illustrated as having a mounting bracket 34 with a pivoting mount end 36 cooperating with bracket 26 so that the booster assembly is positioned as shown in FIG. 1 for initial installation. The booster assembly 32 has a push rod 38 extending rearwardly therefrom, with the forward end 40 being suitably secured to the booster assembly for actuation and release thereof in a manner well known in the art. The rear end 42 of push rod 38 has a reduced diameter portion 44 formed adjacent the extreme rear end surface 46 of the push rod but spaced axially toward the forward end 40 of the push rod along the push rod longitudinal axis 48. Reduced diameter portion 44 is defined by a pair of axially spaced shoulders 50 and 52. For reasons further described below, shoulders 50 and 52 are rounded to provide bearing-like surfaces.

Bracket 22 has a body portion 54 and mounting means formed by flanges 56 and 58. The bracket body portion 54 is generally perpendicular to the side 24 of pedal arm 16 and the flanges 56 and 58 are parallel thereto so as to provide securing means securing bracket 54 of the pedal arm. The flanges may be welded or otherwise secured to the pedal arm.

Bracket body portion 54 is defined by an upper body section 60 and a lower body section 62 joined by a radius bend surface 64. As can be seen, the body portion 54 has a bend in it formed along bend axis 66, so that the upper body section 60 and the lower body section 62 are positioned at an angle 68 to define a concave bracket side 70. Concave bracket side 70 faces forwardly toward the dash opening 30 and the booster assembly 32. The bend axis 66 is substantially perpendicular to the side 24 of the pedal arm 16 and therefore is substantially perpendicular to the plane of movement of the pedal arm 16. The end 72 of the upper body section 60 which is positioned remotely from the bend axis 66, and the end 74 of the lower body section 62 which is positioned remotely from the bend axis 66, are positioned so that they are no further away from the booster assembly 32, and therefore from the forward end 40 of push rod 38, than is the bend axis 66. In the normal release position shown in FIG. 2, ends 72 and 74 are closer to the forward end 40 of the push rod 38 than is bend axis 66. The full stroke of the pedal arm is such that at no time is either end 72 or end 74 positioned further away from the push rod end 40 than is the bend axis 66. This assures retention of the push rod in position in the bracket 22 as will be further indicated below.

The bracket upper body section 60 is provided with a slot 76 cut through the upper body section end 72 and extending downwardly to the area of the bend axis 66. Slot 76 has an outer end 78 forming a slot entry defined by slot guide sides 80 and 82. Slot guide sides 80 and 82 are non-parallel, being in a generally V-like arrangement with the wider opening part at the bracket end 72, the guide sides 80 and 82 tapering the slot entry inwardly so that the slot entry becomes more narrow as it extends further away from the bracket body section end 72. The slot is then defined by retainer sides 84 and 86, which are parallel slot side surfaces joining the non-parallel guide sides 80 and 82 at their upper ends and extending to the area of the bend axis 66, where the slot inner end 88 is located. Slot inner end 88 may be formed in a semi-circular manner.

Prior to installation of the booster assembly 32 with its push rod 38, the pedal arm 16 may be hanging vertically from the pivot axis 18. Therefore the upper body section of bracket 22 is also preferably substantially vertical so that its slot 76 opens upwardly. The assembly operator will insert the push rod 38 through the opening 30 so that the reduced diameter portion 44 is positioned over slot outer end 78. The push rod 38 is then released and the push rod will immediately drop through the slot 76 to the position illustrated in FIG. 1. The slot guide sides 80 and 82, being somewhat wider than the push rod, will guide it so that the retainer sides 84 and 86 readily receive the reduced diameter portion 44 of the push rod as this occurs. Thus the reduced diameter portion 44 will be positioned in the area of the slot inner end 88. The rounded shoulder 50 of the push rod will have its rounded portion engaging a part of the radius bend surface 64 in a ball and socket-like manner, as illustrated in FIG. 1.

It has been found to be desirable to provide a bumper 90 over a part of the reduced diameter portion 44 immediately adjacent shoulder 52, the bumper preferably being shaped to fit the rounded shoulder as shown in the drawing. The bumper may be made of rubber or a rubber-like material. It is the function of the bumper to axially separate the shoulder 52 from the adjacent side of the bracket body portion 54 so that upon quick release of the pedal arm there is no clicking noise generated between the bracket and the push rod. Therefore shoulder 52 operatively engages the bracket on the side of the radius bend surface 64 opposite the side of the radius bend engaged by shoulder 50.

Once the push rod 38 has reached the position shown in FIG. 1, the booster pivot mount end 36 is secured to the mounting bracket 26 and the booster assembly is pivoted to its assembled position shown in FIG. 2. The booster mounting bolt assembly 92 is tightened in place, securely mounting the booster assembly 32 on the forward side of dash 12. The pivoting movement of the booster assembly 32 exerts a force along the longitudinal axis 48 of the push rod 38, moving the pedal arm 16 to the released position illustrated in FIG. 2. Thus the concave bracket side 70 of the bracket body portion 54, formed by angle 68 of the body sections 60 and 62, retains the push rod in position as the brake pedal is actuated and released. In operation of the pedal arm 16 it will normally not be depressed as far as the position illustrated in FIG. 1, so that the forward sides of the upper and lower body sections 60 and 62 will always be at such an angle relative to the longitudinal axis 48 of the push rod that the push rod is retained in engagement with the radius bend surface 64, and will not tend to move upwardly in slot 76. The connection is therefore maintained under all such conditions of operation.

When the push rod is in position in the slot inner end, shoulders 50 and 52 operatively engage the bracket body portion 54, and more particularly upper body section 60, lower body section 62 and the radius bend surface 64 on opposite sides thereof. The shoulders are in force-transmitting relation with the bracket body. When the pedal arm is pivotally moved in the actuating direction, shoulder 50 receives the actuating force from the bracket 22 and transmits it through the push rod 38 to the booster assembly 32. Upon pedal release, the shoulder 52, through bumper 90, receives force from the bracket 22 and transmits it to the push rod 38 in a pulling manner to the booster assembly 32 if the booster power wall return spring has not moved the power wall and the booster valve assembly, and therefore the push rod 38, so as to keep up with the releasing movement of the pedal arm 16. Thus the shoulders 50 and 52 are positioned so as to be able to transmit forces along the longitudinal axis 48 of push rod 38 between the push rod and the bracket 22, and therefore pedal arm 16, in both directions.

The embodiments of the invention in which an exclusive property or privilege is claimed are defined as follows:

1. A connection between a pedal arm mounted by pivot means on a fixed body portion and a push rod for a brake booster, said connection comprising:

said pivotally mounted pedal arm being pivotally movable in a plane;

said push rod being normally positioned with its longitudinal axis parallel to the plane of pedal pivotal movement, said push rod having one end connected for actuation of a brake booster and the other end connected for force-transmitting movements between the push rod and the pedal arm, and a reduced diameter portion adjacent said other end defined by axially spaced shoulders;

and a bracket secured to said pedal arm, said bracket having a body portion and mounting means by which said bracket is secured to said pedal arm, said body portion being bent to define a radius bend surface along a bend axis substantially perpendicular to the plane of pedal pivotal movement to provide an upper body section and a lower body section, said body sections having ends remotely spaced from the bend axis and normally located closer to said push rod one end that is the bend axis, said upper body section having an open-ended slot formed therein, said slot having an outer end opening through the upper body section remotely spaced end, said slot extending toward the bend axis and terminating in a slot inner end located substantially on the bend axis, said slot outer end defining a slot entry for receiving said push rod reduced diameter portion during installation connection of said push rod with said pedal arm, and slot retainer sides joining said slot entry and said slot inner end, said slot retainer sides being spaced apart so that the width of said slot from said slot entry to the slot inner end is at least as large as the diameter of said push rod reduced diameter portion so as to receive said push rod reduced diameter portion therebetween in sliding guided relation during installation connection of said push rod to said pedal arm;

said push rod being connected to said pedal arm after positioning said reduced diameter portion in said slot entry and sliding it into said slot so that it is positioned in said slot inner end with said shoulders operatively engaging opposite sides of said bracket body in the vicinity of said radius bend surface in force-transmitting relation with one of said shoulders receiving force from pedal arm pivotal movement in one direction and the other of said shoulders receiving force from pedal arm pivotal movement in the opposite direction, said shoulders also being capable of delivering force from said push rod to said pedal arm in said one direction and said opposite direction, the angle of the bracket bend formed by said bracket upper and lower body portions at said bend axis then preventing removal of said push rod from said slot inner end once the brake booster has been secured in operational relation to said pedal arm.

2. A connection between a pedal arm mounted by pivot means on a fixed body portion and a push rod for a brake booster, said connection comprising:

said pivotally mounted pedal arm being pivotally movable in a plane;

said push rod being normally positioned with its longitudinal axis parallel to the plane of pedal pivotal movement, said push rod having one end connected for actuation of a brake booster and the other end connected for force-transmitting action between the push rod and the pedal arm, and a reduced diameter portion adjacent said other end defined by axially spaced shoulders;

and a bracket secured to said pedal arm, said bracket having a body portion and mounting means by which said bracket is secured to said pedal arm, said body portion being bent to define a radius bend surface along a bend axis substantially perpendicular to the plane of pedal pivotal movement to provide a planar upper body section and a planar lower body section, each of said body sections having an end remotely spaced from the bend axis and normally located closer to said push rod one end than is the bend axis so that said body sections and said radius bend surface present a concave bracket side opening toward said push rod one end, said upper body section having an open-ended slot formed therein, said slot having an outer end and a center section and an inner end, said outer end opening through the upper body section remotely spaced end and being defined by non-parallel guide sides converging toward said slot center section, said slot extending toward the bend axis and terminating in a slot inner end located substantially on the bend axis, said slot center section having slot retainer sides joining said slot guide sides and said slot inner end, said slot retainer sides being substantially parallel and spaced apart so that the width of said slot center portion between said slot retainer sides is at least as large as the diameter of said push rod reduced diameter portion so as to receive said push rod reduced diameter portion therebetween in sliding guided relation during installation connection of said push rod to said pedal arm;

said push rod being connected to said pedal arm after positioning said reduced diameter portion in said slot outer end and sliding it into said slot through said slot center section so that it is positioned in said slot inner end with said shoulders operatively engaging said bracket body portions and said radius bend surface on opposite sides thereof in force-transmitting relation with one of said shoulders receiving force from pedal arm pivotal movement in one direction and the other of said shoulders receiving force from pedal arm pivotal movement in the opposite direction, said shoulders also being capable of delivering force from said push rod to said pedal arm in said one direction and said opposite direction, the angle of the concave bracket side formed by said bracket upper and lower body portions at said bend axis preventing removal of said push rod from said slot inner end once the brake booster has been secured in operational relation to said pedal arm.

3. A connection between a pedal arm mounted by pivot means on a fixed body portion and a push rod for a brake booster, said connection comprising:

said pivotally mounted pedal arm being pivotally movable in a plane;

said push rod being normally positioned with its longitudinal axis parallel to the plane of pedal pivotal movement, said push rod having one end connected for actuation of a brake booster and the other end connected for force-transmitting movements between the push rod and the pedal arm, and a reduced diameter portion adjacent said other end defined by axially spaced shoulders;

and a bracket secured to said pedal arm, said bracket having a body portion and mounting means by which said bracket is secured to said pedal arm, said body portion being bent to define a radius bend surface along a bend axis substantially perpendicular to the plane of pedal pivotal movement to provide an upper body section and a lower body section, said body sections having ends remotely spaced from the bend axis and normally located closer to said push rod one end than is the bend axis, said upper body section having an open-ended slot formed therein, said slot having an outer end and a center section and an inner end, said outer end opening through the upper body section remotely spaced end and defined by non-parallel guide sides converging toward said slot center section, said slot extending toward the bend axis and terminating in a slot inner end located substantially on the bend axis, said non-parallel guide sides also defining a slot entry for receiving said push rod reduced diameter portion during installation connection of said push rod with said pedal arm, said slot center section having slot retainer sides joining said slot outer end guide sides and said slot inner end, said slot retainer sides being spaced apart so that the width of said slot center portion between said slot retainer sides is at least as large as the diameter of said push rod reduced diameter portion so as to receive said push rod reduced diameter portion therebetween in sliding guided relation during installation connection of said push rod to said pedal arm;

said push rod being connected to said pedal arm after positioning said reduced diameter portion in said slot entry and sliding it into said slot through said slot outer end and said slot center section so that it is positioned in said slot inner end with said shoulders operatively engaging opposite sides of said bracket body in the vicinity of said radius bend surface in force-transmitting relation with one of said shoulders receiving force from pedal arm pivotal movement in one direction and the other of said shoulders receiving force from pedal arm pivotal movement in the opposite direction, said shoulders also being capable of delivering force from said push rod to said pedal arm in said one direction and said opposite direction, said push rod reduced diameter portion and said shoulder adjacent said push rod other end having a shock and noise absorbing bumper located axially between said bracket and that shoulder, said bumper eliminating click-like noises during fast release of the pedal arm following actuating movement thereof, the angle of the bracket bend formed by said bracket upper and lower body portions at said bend axis then preventing removal of said push rod from said slot inner end once the brake booster has been secured in operational relation to said pedal arm.

* * * * *